Dec. 4, 1951 W. A. LENZ ET AL 2,577,136
PHOTOPRINT WASHER
Filed April 2, 1949 2 SHEETS—SHEET 1
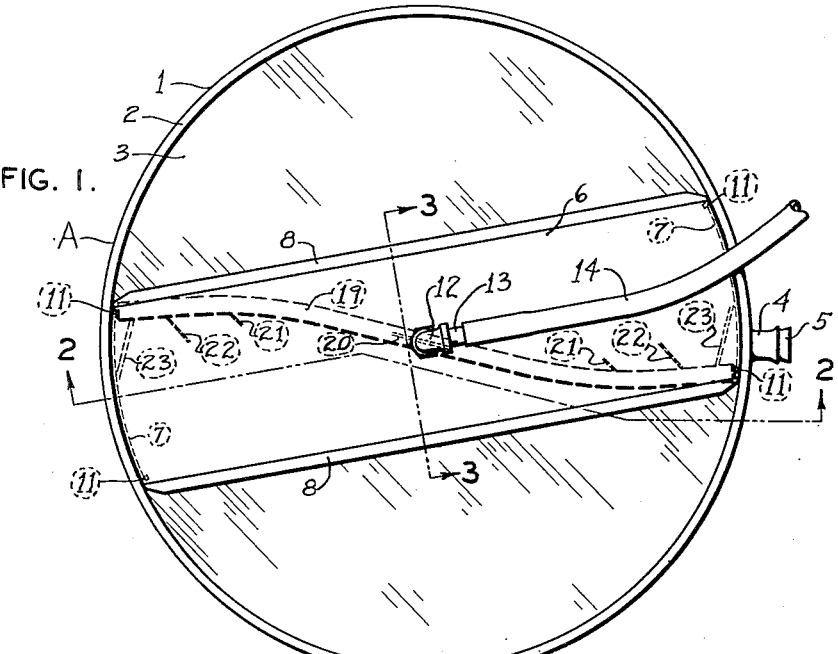
FIG. 1.
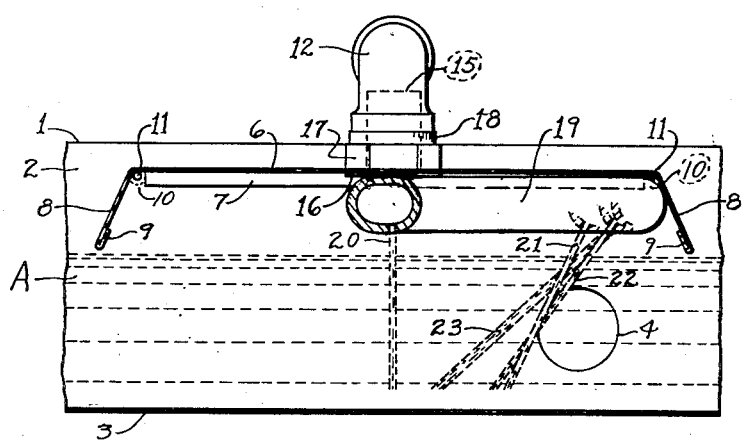
FIG. 2.
FIG. 3.
INVENTORS
WILLIAM A. LENZ
HERBERT R. LENZ
BY
ATTORNEY

INVENTORS
WILLIAM H. LENZ
BY HERBERT R. LENZ

ATTORNEY

Patented Dec. 4, 1951

2,577,136

UNITED STATES PATENT OFFICE 2,577,136

PHOTOPRINT WASHER

William A. Lenz and Herbert R. Lenz,
Lebanon, Mo.

Application April 2, 1949, Serial No. 85,148

15 Claims. (Cl. 95—93)

This invention relates in general to certain new and useful improvements in photoprint washers.

The primary object of the present invention is to provide a photoprint washer which is simple, durable, and is equipped with an effective anti-splash device to confine within the washer the spatter and spray resulting from the injected streams of water by which the washing action is carried out.

It is a further object of the present invention to provide a photoprint washer in which the force of the spray jets is directed in such a manner that the prints will quickly become shuffled and uniformly adjusted in a concentric circle approximately midway between the center and outer periphery of the washer.

It is a further object of the present invention to provide a photoprint washer having uniquely arranged water jets or spray inlets which serve to impart motion to the prints while causing them to assume positions at or near the surface of the water with their leading edges down and their trailing edges up, thus obviating any perceptible friction between the prints and the metal of the washer.

It is also an object of the present invention to provide a photoprint washer having positive means for imparting sufficient velocity to the wash water, so that used or waste water will be ejected by centrifugal force, thereby greatly reducing the washing time required.

It is an additional object of the present invention to provide a photoprint washer constructed in such a manner that the waste water, once ejected under the influence of centrifugal force, cannot recirculate into the wash water containing the prints.

With the above and other objects in view, our invention resides in the novel features of form, construction, arrangement, and combination of parts presently described and pointed out in the claims.

In the accompanying drawings (two sheets)—

Figure 1 is a top view of a single-pan stationary type photoprint washer constructed in accordance with and embodying certain portion of the present invention;

Figure 2 is a vertical sectional view of the photoprint washer taken approximately along the line 2—2 of Figure 1;

Figure 3 is a vertical sectional view taken approximately along the line 3—3 of Figure 1;

Figure 4:
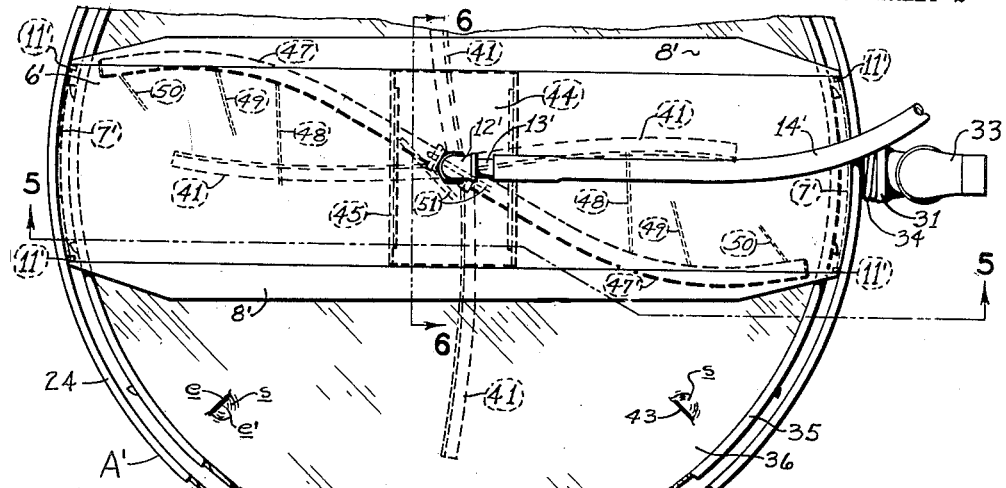
Figure 4 is a top view of a double-pan rotating type photoprint washer constructed in accordance with and embodying the present invention.
Figure 5:
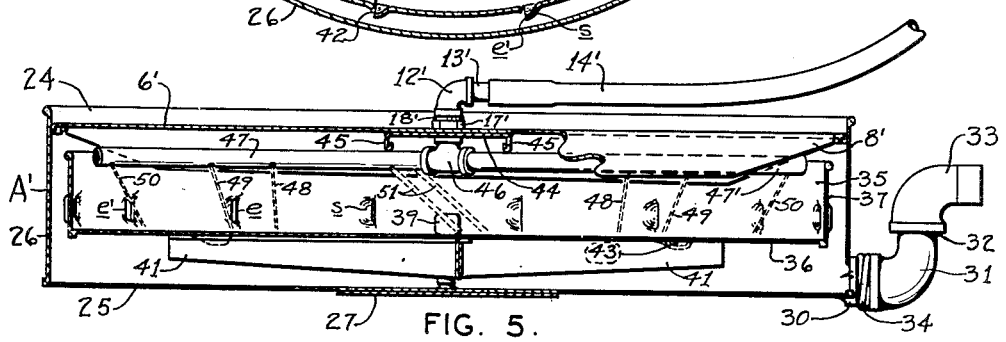
Figure 5 is a vertical sectional view of the photoprint washer taken approximately along the line 5—5 of Figure 4.

Referring now in more detail and by reference characters to the drawings, which illustrate practical embodiments of the present invention, A designates a single-pan type photoprint washer comprising a suitably dimensioned stationary shallow pan or tub 1 integrally including a cylindrical wall 2 and a flat bottom wall 3. Soldered, welded, or otherwise suitably secured in the side wall 2 adjacent to the bottom wall 3 and projecting radially outwardly therefrom is a water outlet 4 preferably flared adjacent its outer end for receiving a cork 5 inserted therein to retain water within the tub 1. It will, of course, be understood that the cork may be removed momentarily and re-inserted for quick adjustment in the operational water level as circumstances may require, or the tub may be used as a tray for holding accumulated prints preparatory to washing by permanently inserting the cork to retain any desired amount of water within the tub before the washer is placed in active operation.

Disposed diametrally across, and substantially in the plane of the rim of, the tub 1 is a bridge 6 provided at its opposite ends with depending arcuate flanges 7 shaped to conform to the curvature of the inside face of the cylindrical tub wall 2 and fit loosely therein. The bridge 6 is furthermore integrally provided along its diametrally extending or longitudinal margins with angularly outwardly and downwardly extending reinforcing flanges 8, which are of uniform width throughout their length and are mitered at their outer extremities. In addition, the flange 8 is furthermore rolled under along its outer longitudinal margin, as at 9, the rolled under edges and mitered corners being primarily designed to prevent accidental damage to the prints which are being washed. It will also be noted that the flanges 8 are of an appropriate width such that the lower margins are relatively close to, but do not dip below, the operational surface level of the wash water, as may be best seen in Figure 3. Furthermore, the bridge 6 is of sufficient width that it may serve as a horizontal shelf on which to lay the prints after they are washed, so that the water draining therefrom will fall back into the tub.

As will be seen by reference to Figure 3, the marginal flanges 7 are somewhat shorter than the overall width of the bridge 6 so as to provide small gaps or recesses 10 which extend between the end faces of the flanges 7 and the inwardly presented faces of the flanges 8 for embracingly engaging radially inwardly projecting pins 11 rigidly fixed in the cylindrical side wall 2 of the tub 1 in such a manner that the bridge 6 will be removably, but securely, supported thereby.

Centrally disposed over the bridge 6 is a pipe elbow 12 provided at its upper end with a horizontally extending connection nipple 13 tightly fitted into a flexible hose 14 adapted, in turn, for connection at its outer end to a faucet or other conventional source of water supply under pressure (not shown). At its downwardly projecting end, the elbow 12 is adapted for threadedly receiving the upper end of spray pipe nipple 15, the nipple having thereon slipped against its lower attachment end a reinforcing washer or collar 16 for facewise engagement against the underface of the bridge 6 and having thereon screw-threaded facewise against the upper face of the bridge 6 a locknut 17 for securely clamping the spraying unit and bridge together. Rubber washer 18 is interposed and drawn up in facewise watertight engagement between the elbow 12 and locknut 17.

Welded, soldered, or otherwise rigidly secured upon the lower attachment end of the nipple 15 and extending horizontally outwardly on either side thereof in closely spaced parallel relation along the under face of the bridge 6 is a somewhat S-shaped spray pipe 19, which is sealed off or suitably plugged at its outer ends and is provided at suitably spaced intervals with angularly downwardly presented apertures or spray holes 20, 21, 22, and 23. The centrally located spray hole 20 is directed obliquely downwardly on a line with the spray pipe 19 and diametrically across the center of the tub 1 in such a manner as to disperse from the center of the tub 1 any photoprints or contaminated water that would otherwise collect therein and yet strike the surface of the water sufficiently over the center that it will not pull any of the photoprints out of line. The next outwardly located pair of spray holes 21 are directed downwardly at a relatively small angle from the vertical and, also, at a small angle inwardly to hold the prints in a uniform concentric circle about the center as the body of water in the tub 1 circles around. The spray holes 22 are somewhat more angulated (with respect to the vertical) and supplement the action of the spray holes 21 by providing needed additional force to keep the water and the prints in a whirling motion. Finally, the outermost pair of spray holes 23 are of substantially greater volume and are more angulated than the other propelling spray holes 21 and 22, being directed outwardly against the cylindrical wall 2 of the tub 1. Thus, the spray jets issuing out of these spray holes 23 will cause the water to whirl faster than the prints, overcoming friction with the tub 1 and creating an accelerated centrifugal scrubbing action that prevents the prints from lodging on or clinging to the vertical wall of the tub 1. The spray pipe 19 is so mounted in relation to the outlet 4 that the spray jet issuing from one of the end spray holes 23 is located slightly above and downstream from the outlet opening 4, as shown in Figure 3, thereby insuring that a maximum amount of contaminated water in the washer will flow through the outlet 4 and, at the same time, propelling the prints past the outlet opening to prevent the prints from lodging therein and clogging the drain.

It should be noted that the spray pipe 19 is completely hooded or shielded by the bridge 6 and the depending flanges 8, so that substantially all of the spray and spatter resulting from impact between the spray jets and the surface of the water will be confined within the enclosed area under the bridge 6.

In use, if the photoprints have not already been accumulated in the tub 1, the cork 5 may be placed within the outlet 4 and the water turned on through the spray pipe 19. As soon as an appreciable volume of water has accumulated in the bottom of the tub, the water will begin to rotate or whirl about the center under the impelling force of the angularly disposed spray jets. The photoprints to be washed may then be dropped into the whirling body of water and will be carried around with it. These spray jets are so uniquely located and directed as to create in the whirling mass of water a form of turbulence which will thoroughly wash the photoprints while keeping them separated from one another. Ordinarily, by the time the tub 1 fills up to such a point that the operational water level therein approaches the lower margins of the flanges 8, the cork 5 should be removed. The water inlet and outlet are so proportioned that the washer will maintain its own proper operational water level, and the washing action may be continued uninterrupted any desired length of time without danger that the tub 1 will either drain dry or overflow.

This type of photoprint washer A, having a single stationary pan or tub, is limited to washing prints of small dimensions only. If it is desired to wash prints of larger dimensions, a modified form of photoprint washer A' must be provided which is substantially larger in size than the previously described photoprint washer A and is so constructed that all friction between the prints being washed and the confining walls of the machine is eliminated and sufficient operational centrifugal force in the wash water can be maintained. The photoprint washer A' comprises a suitably dimensioned stationary tub 24 having a substantially flat bottom wall 25 and an upstanding cylindrical side wall 26. The bottom wall 25 is centrally provided with a reinforcing plate 27 to which is welded or brazed a vertical stud 28 which extends concentrically through the bottom wall 25 and the reinforcing plate 27, the stud and plate being secured in place by solder joints 29, 29, both above and below bottom wall 25.

Welded, soldered, or otherwise suitably mounted in, and extending through, the side wall 26 just above the bottom wall 25 is a radially projecting horizontal nipple 30 and swingably threaded thereon is a conventional pipe elbow 31 provided at its opposite end with an integrally formed extension 32, in turn, provided at its outer end with a second elbow 33, and interposed between the adjacent portions of the side wall 26 and the end face of the elbow 31 is a compression spring 34 for holding the elbow and its associated elbow 33 at any desired position. It should be noted in this connection that the length of the projecting straight section 32 is such that the open end of the elbow 33 will be positioned substantially above the desired liquid level within the tub 24 when the elbow 31 is turned with its extension section 32 in vertically upwardly presented position; and it will also be apparent that, by swinging the elbow 31 and its associated elbow 33 downwardly through 180°, the tub 24 may be completely drained; and, finally, by positioning the elbows 31, 33, in any intermediate position, various different water levels may be maintained within the tub 24.

Provided for disposition within the tub 24 is an annular tray or basket 35 including a horizontal bottom wall 36 and a cylindrical side wall 37 of somewhat smaller diameter and shorter height than the side wall 26. Fixed centrally in, and extending vertically through, the bottom wall 36 is a tubular member or quill 38 seated for rotary movement upon the upper end of the stud 28 and threadedly provided at its upper end with a retaining cap 39 for housing a large bearing ball 40 upon which the basket 35 is thus able to rotate freely.

Soldered, welded, or otherwise secured along their respective upper margins upon the under face of the basket bottom wall 36 is a plurality of depending ribs 41, each extending inwardly from a point adjacent the outer circumference of the bottom wall 36, being somewhat curved longitudinally and suitably secured adjacent their inner ends in facewise tangential abutment upon the outer face of the quill 38, each of the ribs 41 extending a short distance beyond the quill 38 and being endwise abuttingly secured along its transverse margin to the lateral face of the next adjacent rib 41, thus embracingly enclosing the quill 38 in an interlockingly reinforced manner.

A plurality of vertically slotted apertures 42 of suitable size and number, being evenly and outwardly punched, pierce the annular vertical wall 37 in positions uniformly and reasonably adjacent to the bottom wall 36. A smaller number of radially slotted apertures 43, having a combined minimum capacity found necessary to drain the basket 35 at a moderate rate of speed, are also evenly spaced and downwardly punched in the bottom wall 36 in positions uniformly and reasonably adjacent to the vertical wall 37. In relationship to the forward direction of rotation of the basket 35, as will be presently more fully described and as indicated by the arrow in Figure 4, the leading edges e of the slots 42, 43, are slightly outwardly deformed or countersunk to obviate any possible friction with the prints being washed in the basket 35 and are of such shape that water brought in contact with the leading edge e thereof will be ejected outwardly from the basket 35 into the tub 24. The trailing edges e' of the apertures or slots 42, 43, are pressed outwardly beyond the leading edges e to form open, narrowly oblong scoops s which cooperate with the leading edges e to expel the contaminated wash water and, in addition, to prevent recirculation of the contaminated wash water from the tub 24 back into the basket 35 when the photoprint washer A' is in operation.

The annular tub wall 26 is provided adjacent its upper margin with four short inwardly projecting studs or pins 11' for supporting a bridge 6' having arcuate peripheral flanges 7' and longitudinal outwardly inclined reinforcing flanges 8', all substantially similar to the corresponding parts of the previously described photoprint washer A.

The bridge 6' is provided upon its inner face with a centrally positioned transversely extending reinforcing plate 44 having depending flanges 45 mitered off at their outer corners to prevent accidental damage to the photoprints. Centrally disposed over the bridge 6' is a pipe elbow 12' provided at its upper end with a horizontally extending nipple 13' tightly fitted into a flexible hose 14' adapted, in turn, for connection at its outer end to a faucet or other conventional source of water supply under pressure (not shown). At its downwardly projecting end, the elbow 12' is adapted for threadedly receiving the upper end of spray pipe nipple 15', said nipple 15' being screw-threaded into the pipe T 46, the upper flange of which is facewise engaged against the under face of the plate 44, and said nipple 15' also having thereon screw-threaded facewise against the upper face of the bridge 6' a locknut 17' for securely clamping the spraying unit and bridge together. Rubber washer 18' is interposed and drawn up in facewise watertight engagement between the elbow 12' and locknut 17'.

Threaded into, and extending outwardly in opposite directions from, the two horizontal branches of the pipe T 46 are longitudinally curved spray pipes 47, 47', which are sealed off or suitably plugged at their outer ends and together provide an overall S-shaped configuration substantially similar to the previously described spray pipe 19. The spray pipes 47, 47', furthermore, are provided at suitably spaced intervals with angularly downwardly presented apertures or spray holes 48, 49, and 50, and the spray pipe 47 is furthermore provided closely adjacent to the pipe T 46, with an additional one or more apertures or spray holes 51. Of the pairs of spray holes 48, 49, and 50, the holes 48 are the most angulated (with respect to the vertical) and provide the principal driving force. The holes 49, consisting of one or more pairs of holes and being of sufficient number to provide one or more pairs of supporting sprays depending upon the diameter of the washer, are progressively disposed at lesser degrees of angularity (with respect to the vertical) and holes 48 in order to minimize the driving force and retard the speed of the revolving basket. The spray jets issuing from the outermost spray holes 50, being generally of no greater volume than the other propelling spray jets, are directed most steeply downwardly and inwardly (at the smallest angle to the vertical), thus serving continuously to drive the photoprints away from the annular wall 37 with a minimum of forwardly propelling action. It should also be noted that the central spray holes 51 are of such size as to provide relatively increased volume of make-up water to the center of the basket 35 to offest at least partially the tendency of the water level to lower at the center of the basket 35 due to centrifugal action.

Figures 6, 7:
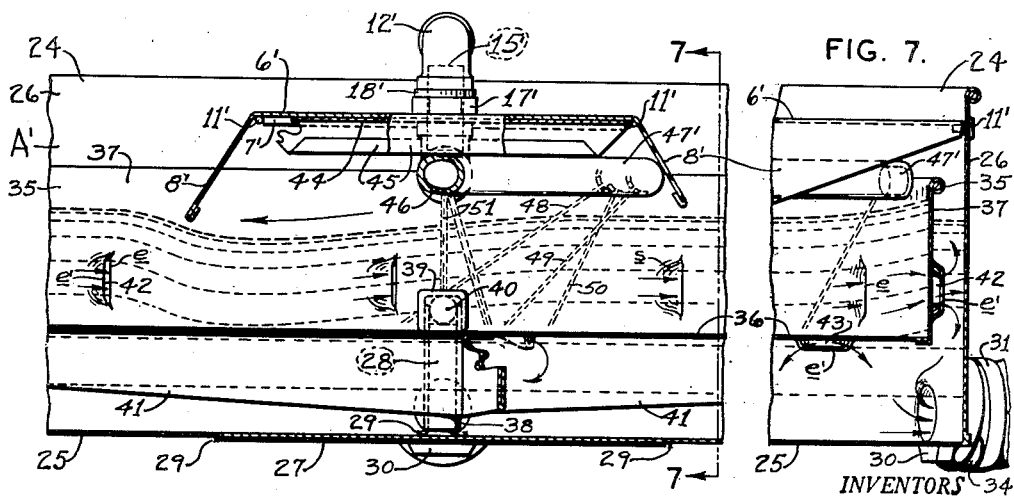
Figure 6 is a vertical sectional view taken approximately along the line 6—6 of Figure 4.
Figure 7 is a vertical sectional view taken approximately along the line 7—7 of Figure 6.

In the washing process, the whirling wash water and the prints, which are carried with the revolving basket 35, attain sufficient speed to create a pronounced centrifugal action. The operational water level in the basket 35 rises toward the rim and is, during operation, substantially higher than the level outside the basket 35 in the tub 24, as shown in Figure 7. This difference in water levels insures a positive ejective action of waste water from the revolving basket 35. Maximum washing speed is attained, since, by centrifugal force, the wash water is circulated outwardly between the prints from the center of the revolving basket 35, and, once the contaminated water is ejected therefrom, it cannot again re-enter the basket. In the washing action, sufficient centrifugal force can be attained so that the water level in the center of the basket 35 will become even lower than the water level in the tub 24. No apertures or slots 43 are, therefore, punched near the center of the bottom wall 36, but are instead positioned outwardly in more or less close proximity to the annular side wall 37, since the greater resulting water pressure from below the bottom wall would otherwise recirculate contaminated waste water from the tub 24 back into the center of the revolving basket 35.

It should be understood that changes and modifications in the form, construction, arrangement, and combination of the several parts of the photoprint washers may be made and substituted for those herein shown and described without departing from the nature and principle of our invention.

Having thus described our invention, what we claim and desire to secure by Letters Patent is:

1. A photoprint washer comprising a shallow tub, a relatively wide bridge member extending diametrally across the tub substantially in the plane of the upper margin thereof and being provided along both of its longitudinal margins with depending flanges, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

2. A photoprint washer comprising a shallow tub, a relatively wide bridge member extending diametrally across the tub substantially in the plane of the upper margin thereof and being provided along both of its longitudinal margins with outwardly deflected depending flanges and along each end with arcuate vertically depending flanges conforming to the curvature of the tub, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

3. A photoprint washer comprising a shallow tub having an upstanding annular side wall provided upon its inner face with a plurality of radially inwardly projecting pins, a relatively wide bridge member carried by said pins and extending diametrally across the tub substantially in the plane of the upper margin thereof, and a spray pipe carried by said bridge member and extending lengthwise along the under face thereof, said spray pipe having a plurality of spaced spray apertures presented angularly downwardly toward the bottom of the tub some of said apertures being disposed at different angles with respect to other apertures so that the various spray jets issuing from said apertures will be directed at different angles with respect to the bottom of the tub.

4. A photoprint washer comprising a shallow tub having a horizontal flat bottom wall, a relatively wide horizontal bridge member extending diametrally across the tub substantially in the plane of the upper margin thereof, a spindle fixed centrally in and projecting upwardly from the bottom wall of the tub, a shallow open-topped cylindrical tray disposed concentrically within the tub and centrally journaled upon the spindle for free rotative movement with respect to the tub, said tray having a relatively flat substantially solid bottom wall, and a spray pipe carried by said bridge member and disposed lengthwise along the under face thereof in upwardly spaced relation to the tray, said spray pipe extending across and on opposite sides of the spindle, said spray pipe having a plurality of spaced spray apertures presented angularly downwardly toward the bottom of the tub, the spray aperture nearest the spindle being inclined at an angle both inwardly and downwardly at an acute angle to the bottom wall of the tray and the successive apertures outwardly toward the extremities of the spray pipe being inclined at progressively less acute angles.

5. A photoprint washer comprising a shallow tub having a horizontal flat bottom wall, and a spray pipe mounted in and extending diametrally across the tub slightly below the plane of the upper margin thereof in substantially symmetrical relation to and on opposite sides of the vertical center-line of the tub and having a plurality of spaced spray apertures disposed in spaced relation along the under side of the pipe and presented angularly downwardly toward the bottom of the tub, the spray aperture nearest said center-line being inclined at an angle both inwardly and downwardly at an acute angle to the bottom wall of the tub and the successive apertures outwardly toward the extremities of the spray pipe being inclined at progressively less acute angles.

6. A photoprint washer comprising a shallow tub, a relatively wide bridge member extending diametrally across the tub substantially in the plane of the upper margin thereof, and a spray pipe carried by said bridge member and extending lengthwise along the under face thereof, said spray pipe having a plurality of spaced spray apertures presented angularly downwardly toward the bottom of the tub, one spray aperture being drilled at either end of the spray pipe, in such size and position that the oppositely corresponding sprays issuing therefrom are of greater volume and are more elevated than the other propelling sprays, and furthermore are directed obliquely outwardly toward the vertical wall of the tub in such position that they enter the wash water outside and beyond the organized whirling ring of prints serving thus to make the wash water whirl faster than the prints therein and to create an accelerated scrubbing action against the vertical annular wall of the tub, thus preventing the prints from striking or lodging on or clinging to the wall.

7. A photoprint washer comprising a shallow tub, a relatively wide bridge member extending diametrally across the tub substantially in the plane of the upper margin thereof, and a spray pipe carried by said bridge member and extending lengthwise along the under face thereof, said spray pipe having a plurality of spaced spray apertures presented angularly downwardly toward the bottom of the tub, one spray aperture being drilled in the spray pipe sufficiently close to the center thereof such that the spray of water under pressure issuing therefrom is directed obliquely downwardly in line with the pipe and diametrically across the center of the tub, serving thus to disperse from the center of the tub any prints or contaminated water that might otherwise collect therein without pulling any prints across the center or forcing any prints out of line.

8. A photoprint washer comprising a shallow tub, a relatively wide bridge member extending diametrally across the tub substantially in the plane of the upper margin thereof, a water spray pipe carried by said bridge member and extending lengthwise along the under face thereof, and a shallow cylindrical tray mounted concentrically within the tub and bearinged for rotation in a predetermined direction, said tray being provided with substantially imperforate side and bottom walls each having a plurality of apertures, said apertures being externally shielded on the side toward the direction of rotation of the tray for providing substantially uni-directional flow of water from the interior of the tray outwardly into the tub when the tray is rotating, said spray pipe having a plurality of spaced spray apertures presented angularly downwardly toward the bottom of the tray to produce rotative movement of the tray.

9. A photoprint washer comprising a shallow tub, a relatively wide bridge member extending diametrally across the tub substantially in the plane of the upper margin thereof, a water spray pipe carried by said bridge member and extending lengthwise along the under face thereof, said spray pipe having a plurality of spaced spray apertures presented angularly downwardly toward the bottom of the tub, and a rotatably mounted tray operatively disposed within the tub, said tray having a substantially imperforate flat bottom wall and an upstanding annular side wall, said tray being provided in its side wall and in its bottom wall with a plurality of apertures, the apertures in the bottom wall being confined to the area directly adjacent to the side wall whereby water will flow uni-directionally outwardly through said apertures from the tray into the tub when the tray is rotating.

10. A photoprint washer comprising a shallow tub, a relatively wide bridge member extending diametrally across the tub substantially in the plane of the upper margin thereof, a water spray pipe carried by said bridge member and extending lengthwise along the under face thereof, and a shallow cylindrical tray mounted concentrically within the tub and freely bearinged for rotation therein, said spray pipe having a plurality of spaced spray apertures positioned for directing jets of water angularly downwardly toward the bottom of the tray to produce rotation of the tray at a predetermined rate of speed relative to the water pressure producing said jets, said spray pipe being provided with at least one spray aperture drilled close to the center thereof and being of relatively large diameter so as to produce a jet of water of sufficient capacity to maintain a desired operational water level in the center of the rotating tray for counterbalancing the outward rate of flow of water through the apertures due to centrifugal force at said predetermined speed of rotation.

11. A photoprint washer comprising a shallow tub, a relatively wide bridge member extending diametrally across the tub substantially in the plane of the upper margin thereof, a spray pipe carried by said bridge member and extending lengthwise along the under face thereof, and a shallow cylindrical basket member mounted concentrically within the tub and freely bearinged for rotation therein, said spray pipe having a plurality of spaced spray apertures presented angularly downwardly toward the bottom of the basket member, the spray apertures drilled in the opposite arms of the spray pipe being uniform in size and progressively less angulated from the center toward the outer ends of the pipe such that the oppositely corresponding sprays issuing therefrom are directed most steeply downwardly and inwardly at the outer ends of the pipe, thereby forcing the photoprints away from the annular walls of the basket and by minimizing the centrifugal force of the wash water therein retard the speed of the rotating basket.

12. A photoprint washer comprising a shallow tub, a bridge member extending diametrally across the tub substantially in the plane of the upper margin thereof, said bridge member integrally including a relatively wide flat top web provided along both of its longitudinal margins with depending flanges, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

13. A photoprint washer comprising a shallow tub, a bridge member extending diametrally across the tub substantially in the plane of the upper margin thereof, said bridge member integrally including a relatively wide flat top web provided along both of its longitudinal margins with angularly outwardly flaring depending flanges, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

14. A photoprint washer comprising a shallow tub, a bridge member extending diametrally across the tub substantially in the plane of the upper margin thereof, said bridge member integrally including a relatively wide flat top web provided along both of its longitudinal margins with outwardly deflected depending flanges and along each end with arcuate vertically depending flanges conforming to the curvature of the tub, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

15. A photoprint washer comprising a shallow tub having a flat bottom wall, a bridge member extending diametrally across the tub substantially in the plane of the upper margin thereof, said bridge member integrally including a relatively wide flat top web parallel to the bottom wall provided along both of its longitudinal margins with depending flanges, and a spray pipe carried by said bridge member and extending lengthwise along the under face thereof and above the plane of the lower edges of the longitudinal flanges, said spray pipe having a plurality of spaced spray apertures presented angularly downwardly toward the bottom of the tub.

WM. A. LENZ.
HERBERT R. LENZ.

REFERENCES CITED

The following references are of record in the file of this patent:

UNITED STATES PATENTS

| Number | Name | Date |
|---|---|---|
| 1,470,188 | Pryde | Oct. 9, 1923 |
| 1,526,603 | Lenz | Feb. 17, 1925 |
| 2,321,435 | Swartz | June 8, 1943 |
| 2,325,255 | Lenz | July 27, 1943 |

FOREIGN PATENTS

| Number | Country | Date |
|---|---|---|
| 27,680 | Great Britain | of 1907 |
| 611,511 | France | July 10, 1926 |